United States Patent [19]
Bell et al.

[11] Patent Number: 5,692,953
[45] Date of Patent: Dec. 2, 1997

[54] AUTOMOTIVE COWL SCREEN ASSEMBLY

[75] Inventors: Mary T. Bell, Monroe; Melvyn J. Clough, Rochester Hills; Willard R. Lewis, Clinton Township, all of Mich.

[73] Assignee: Ford Global Technologies, Inc., Dearborn, Mich.

[21] Appl. No.: 488,525

[22] Filed: Jun. 9, 1995

[51] Int. Cl.⁶ .................................................. B60H 1/28
[52] U.S. Cl. ........................ 454/146; 296/192; 411/182
[58] Field of Search ...................... 296/192; 454/146; 411/182

[56] References Cited

U.S. PATENT DOCUMENTS

| | | |
|---|---|---|
| Re. 17,870 | 7/1930 | Carr . |
| 763,210 | 6/1904 | Schwamberger et al. . |
| 2,552,066 | 10/1951 | Sorensew . |
| 3,875,661 | 4/1975 | Lidstrom et al. . |
| 4,010,671 | 3/1977 | Hubbard et al. . |
| 4,466,654 | 8/1984 | Ale . |
| 4,529,244 | 7/1985 | Zandel . |
| 4,564,232 | 1/1986 | Fujimori et al. . |
| 4,573,733 | 3/1986 | Zaydel . |
| 4,679,845 | 7/1987 | Detampel et al. . |
| 4,707,020 | 11/1987 | Enokida et al. . |
| 4,923,347 | 5/1990 | Moryl et al. . |
| 4,973,102 | 11/1990 | Bien . |
| 5,028,189 | 7/1991 | Harley . |
| 5,098,765 | 3/1992 | Bien . |
| 5,222,852 | 6/1993 | Snyder . |
| 5,228,742 | 7/1993 | Johnson et al. . |
| 5,379,566 | 1/1995 | Schwocer . |
| 5,536,125 | 7/1996 | Gaw, Jr. ............................... 411/182 |

FOREIGN PATENT DOCUMENTS

| | | | |
|---|---|---|---|
| 59-14576 | 1/1984 | Japan | .................. 296/192 |
| 60-174318 | 8/1985 | Japan | .................. 454/146 |
| 1736808 | 5/1992 | Japan | .................. 296/192 |

*Primary Examiner*—Harold Joyce
*Attorney, Agent, or Firm*—David B. Kelley, Esq.

[57] ABSTRACT

An automotive vehicle cowl cover assembly has a body cowl surface made of a material with a first coefficient of thermal expansion and an elongated ventilation screen covering the air intake opening with ventilation slots therein made from a material having a second coefficient of thermal expansion. The body cowl surface has a plurality of laterally spaced, rectangularly shaped body apertures and the screen has a plurality of circular mounting apertures formed therethrough registerable with the plurality of body mounting apertures. A plurality of fasteners engage with the ventilation screen to the body cowl surface, each of the fasteners including a rectangularly shaped nut member fitted in one of the plurality of body apertures and a toothed push-pin insertable through one of the plurality of apertures in axially fast relationship with the nut member to clampingly engaging the ventilation screen against the body cowl surface, the push-pin laterally slidingly received in the first slot and received in axially locking relationship with the ribs of the second slot such that the push-pin slides laterally with respect to the nut member to compensate for lateral relative movement between the ventilation screen and the body cowl surface in response to changes in temperature therearound.

4 Claims, 4 Drawing Sheets

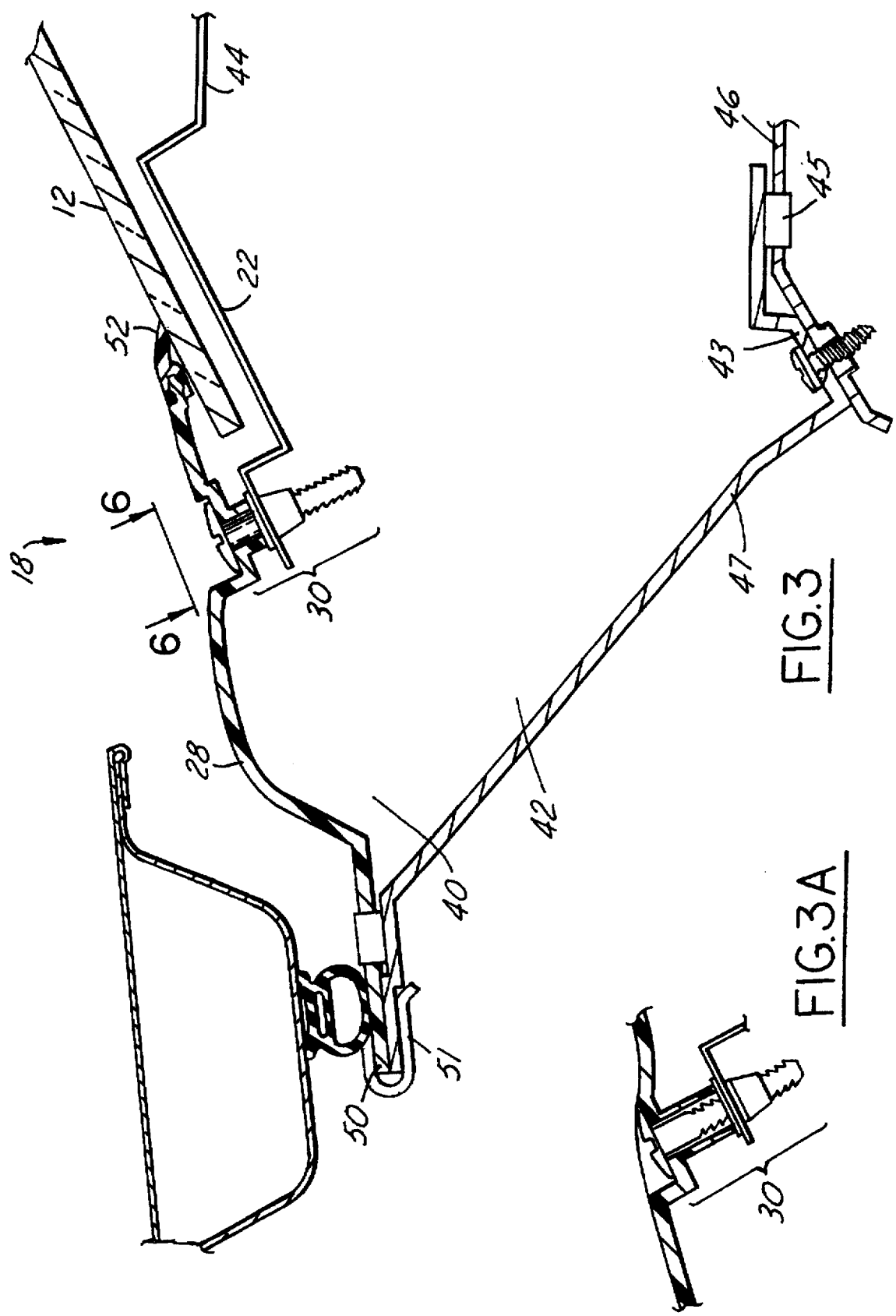

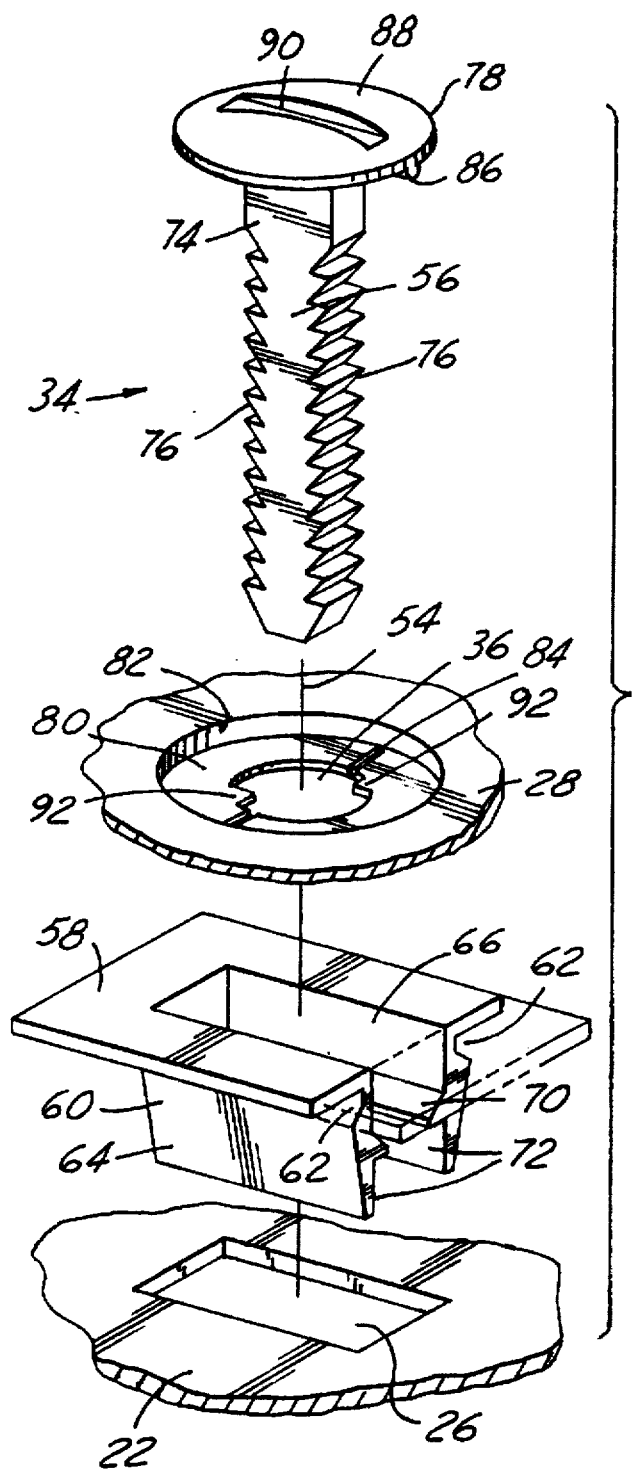
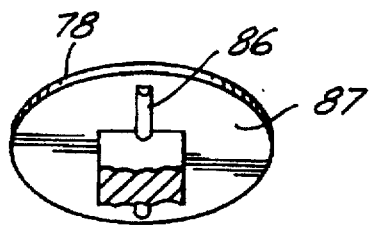
FIG. 5
FIG. 4
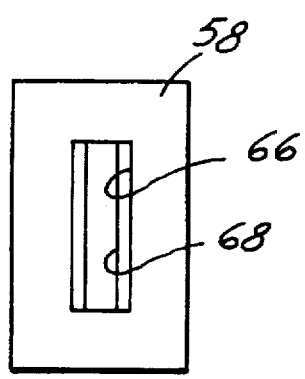
FIG. 4A

5,692,953

AUTOMOTIVE COWL SCREEN ASSEMBLY

FIELD OF THE INVENTION

The present invention relates to automotive cowl assemblies, and, in particular, to a thermally adjustive cowl screen and ventilation assembly.

BACKGROUND OF THE INVENTION

A long sought goal of automotive body designers is to reduce vehicle weight while retaining function and styling capability. Weight reduction in vehicles typically leads to improved fuel economy, desirable for many reasons including decreased consumer fuel costs and conservation of natural resources. To this end, selected body components can be made of plastic or other composite materials which are lighter and less expensive than traditionally used materials, such as sheet metal or aluminum. A cowl screen is one such body component which advantageously can be made of a non-traditional material, partially due to its relatively protected location between the vehicle windshield and hood.

While desirable for the aforementioned reasons, use of lighter weight materials for a cowl screen assembly presents another problem. When two or more body panels made of different materials are attached or otherwise connected together, differences in the coefficients of thermal expansion of those materials can cause thermal stresses at the connection under varying heat loads. These stresses, if not properly relieved, may result in bending, stretching, deformation and cracking of the panels, a most unacceptable consequence from both the aesthetic and functional perspective.

Prior approaches to the problem, such as those shown in U.S. Pat. Nos. 5,222,852 (Snyder), 5,098,765 (Bien), and 4,973,102 (Bien), have resulted in fastening schemes which are complex, difficult to assemble, and expensive to manufacture.

SUMMARY OF THE INVENTION

Responsive to the above noted problems, the present invention provides a vehicle cowl cover assembly, which is easy to assemble and inexpensive to manufacture, and which compensates for lateral relative movement between attaching panels in response to temperature changes therearound. The vehicle has a body, formed of a metallic material with a first coefficient of thermal expansion, defining an engine compartment and a passenger compartment. An air intake opening is formed between a cowl inner panel positioned rearwardly proximate of the engine compartment and a cowl outer panel having a laterally extending body cowl surface toward the air intake opening. Covering the air intake opening is an elongated ventilation screen with ventilation slots, the screen having a second coefficient of thermal expansion. A plurality of mounting apertures formed through the ventilation screen are registerable with a plurality of laterally spaced, rectangularly shaped body apertures in the body cowl surface. The ventilation screen is attached to the cowl inner panel extension on a forward edge thereof proximate the engine compartment. Attachment of the ventilation screen to the cowl surface for sliding engagement thereto is accomplished by a plurality of fasteners engageable attached laterally along the ventilation screen and the body cowl surface. The fasteners include a rectangularly shaped nut member fitted in one of the plurality of body apertures and having first and second slots running generally lateral to the vehicle, and a toothed push-pin having an elongated axis insertable through one of the plurality of apertures in axially fast relationship with the nut member to clampingly engage the ventilation screen against the body cowl surface. The push-pin is laterally slidingly received in the first slot and received in axially locking relationship in the second slot such that the push-pin slides laterally with respect to the nut member to compensate for lateral relative movement between the ventilation screen and the body cowl surface due to temperature changes therearound.

An advantage of the present invention is a cowl cover assembly which compensates for differences in lateral deflection of component panels having different coefficients of thermal expansion when exposed to varying heat loads.

Another advantage of the present invention is a cowl cover assembly which is easily and quickly assembled, and which is inexpensively made.

A feature of the present invention is a fastener having a rectangularly shaped nut member with a pair of slots, one narrower than the other, which receive a toothed push-pin in axially fast relationship therewith to clampingly engage the ventilation screen against a vehicle body cowl surface, the push-pin laterally slidingly received in the first slot and received in axially locking relationship with the second slot such that the push-pin slides laterally with respect to said nut member to compensate for lateral relative movement between the ventilation screen and the body cowl surface in response to changes in temperature therearound.

BRIEF DESCRIPTION OF THE DRAWINGS

Other objects, features, and advantages of the cowl cover assembly according to the present invention will be apparent to those skilled in the automotive body arts upon reading the following description with reference to the accompanying drawings in which:

FIG. 3 is a cross-sectional view of a cowl cover assembly attached to an automotive vehicle body taken along line 3—3 of FIG. 1;

FIG. 3A is a cross-sectional view of a cowl cover assembly fastener showing the variable height connectivity thereof taken along line 3—3 of FIG. 1;

FIG. 4 is an exploded perspective view of a cowl cover assembly fastener, including a rectangularly shaped nut into which a push-pin is laterally slidingly received to compensate for lateral relative movement between the ventilation screen and the body cowl surface;

FIG. 4A is a top view of a nut showing a top slot and a narrower bottom slot for receiving the push-pin;

FIG. 5 is a bottom view of the head of a fastener push-pin for a cowl cover assembly according to the present invention;

DESCRIPTION OF THE PREFERRED EMBODIMENTS

Figure 1:
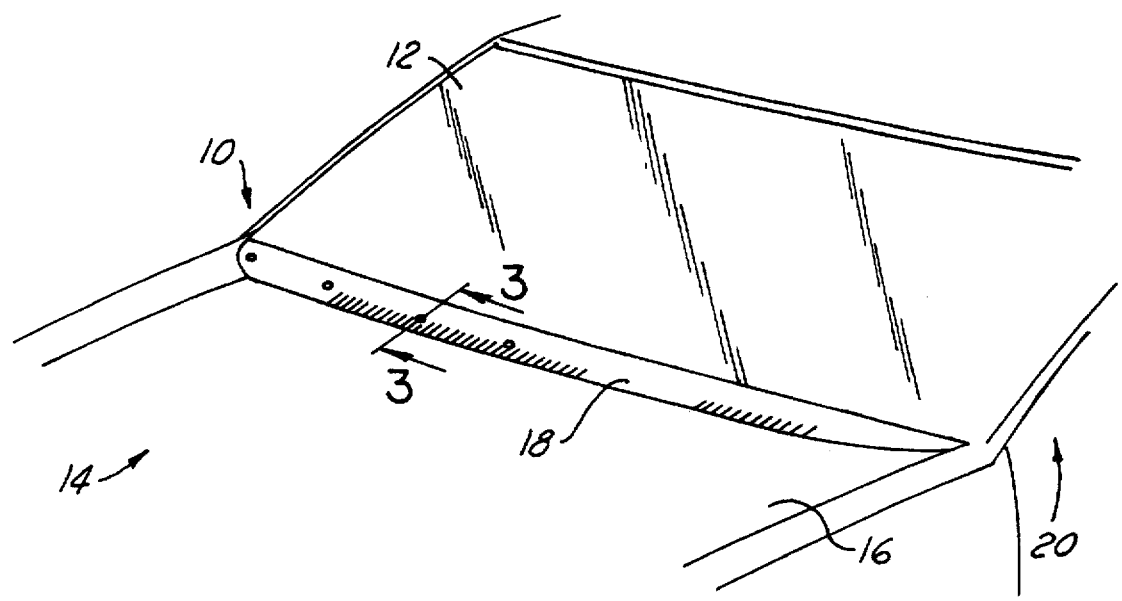
FIG. 1 is a perspective view of an assembled automotive cowl cover according to the present invention shown on an automotive vehicle.
Figure 2:
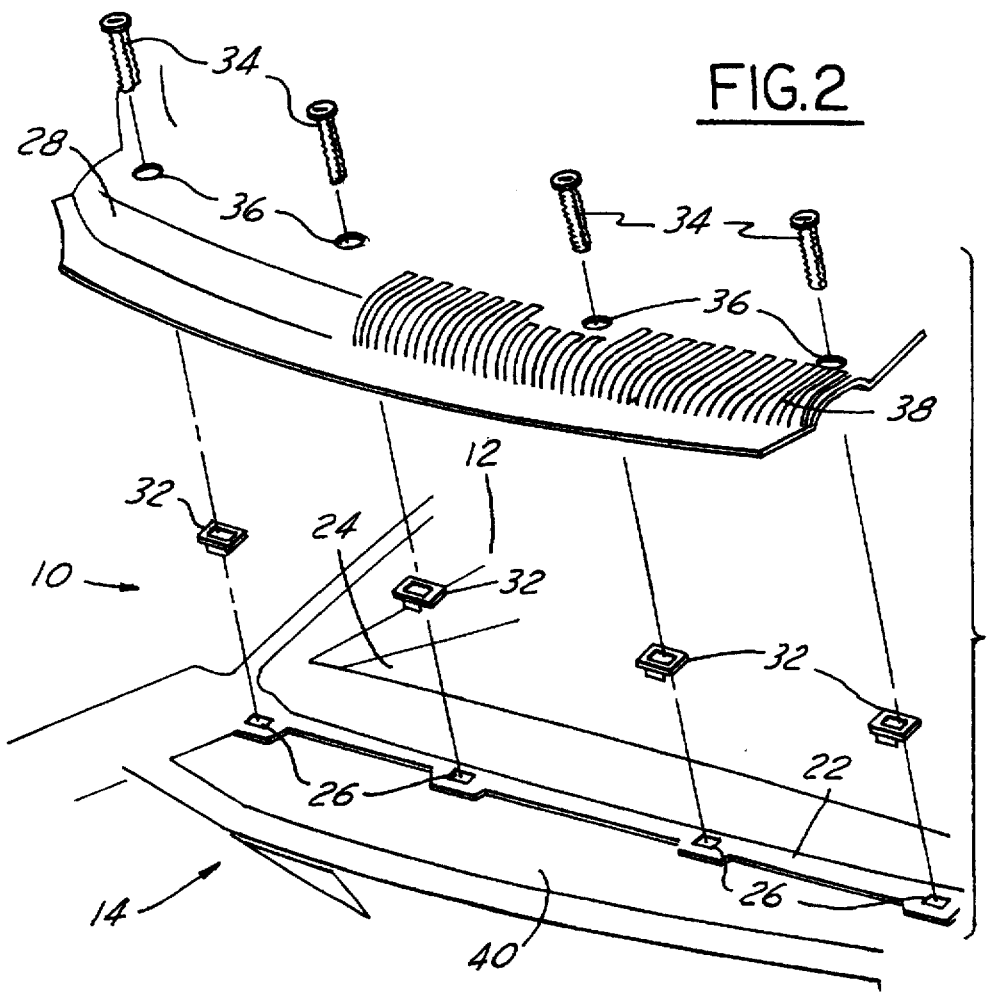
FIG. 2 is an exploded perspective view of a cowl cover assembly according to the present invention.

Turning now to FIG. 1, a forward area of an automotive vehicle 10 is shown with a windshield 12, an engine compartment shown generally at 14 covered by a hood 16, and a cowl cover assembly 18 between the windshield 12 and the engine compartment 14. The vehicle body, which bounds a passenger compartment 20 and the engine compartment 14, is formed of a metallic material, for example, sheet metal, which has a coefficient of thermal expansion of approximately 0.00000633 in/in/F°. As best seen in FIG. 2, a laterally extending body cowl surface 22 is positioned rearwardly of the engine compartment 14 at a lower forward section 24 of the windshield 12. The body cowl surface 22 includes rectangularly shaped body apertures 26 which are laterally spaced along the width of the vehicle 10. An elongated ventilation screen 28 made of a plastic material, and having a coefficient of thermal expansion in the range of approximately 0.004 in/in/F° to 0.005 in/in/F°, attaches to the body cowl surface 22 with fasteners 30 (FIG. 3) for compensating for lateral relative movement between the ventilation screen 28 and the body cowl surface 22 in response to temperature changes therearound. The fasteners 30 generally include a rectangular nut member 32 fitted into one of the body apertures 26 and a toothed push-pin 34 inserted through a mounting aperture 36 formed in the ventilation screen 28 (FIG. 2). The ventilation screen 28 has a series of longitudinally extending slots 38 therein and covers an air intake opening 40 which provides air for the climate control systems (not shown) of the vehicle 10. The slots 38 allow air flow therethrough while preventing debris, such as leaves, from entering the air intake opening 40.

Referring now to FIG. 3, the cowl cover assembly 18 of the present invention is shown in cross-section. An air intake plenum 42 is formed by a cowl outer panel 44, a cowl inner panel 46, and a cowl inner panel extension 47 which is attached by a screw 43 to the cowl inner panel 46. The cowl outer panel 44 is not connected to the cowl inner panel extension 47, thus leaving a gap therebetween which forms the air intake opening 40 into the air intake plenum 42. A foam seal 45 seals the air intake plenum 42 from the surrounding environment. The vehicle windshield 12 runs generally parallel to the body cowl surface 22 which extends from the cowl outer panel 44 toward the air intake opening 40. The ventilation screen 28 is attached at a forward edge 50 to the cowl inner panel extension 47 with a clip 51 (only one shown in FIG. 3). As used is herein, the terms forward and rearward, upward and downward, and other terms of direction, will be as illustrated in FIGS. 1 and 3. The rearward edge 52 of the ventilation screen 28 abuts an outer surface of the windshield 12.

Fasteners connect the ventilation screen 28 with the cowl outer panel 44, as further described below. Due to the contour of the ventilation screen 28 in relation to the cowl outer panel 44, varying distances occur therebetween at the mounting apertures 36 laterally therealong. That is to say, the distance between the ventilation screen 28 and the body cowl surface 22 at the mounting apertures 36 varies along the length of the body cowl surface 22. As a result, the fasteners 30 provide axial variability for attachment (FIG. 3A) as well as flexibility for lateral ventilation screen 28 deflection with respect to the body cowl surface.

Turning now to FIG. 4, one of the plurality of fasteners 30 will be described, it being understood that others function in the same manner. The fastener 30 includes a push-pin 34 defining a longitudinal axis 54 along a shank 56 portion thereof, its downwardly extending axis being inferred. The fastener includes the rectangularly shaped nut member 32 which is fitted into a body aperture 26 and has a retainer surface 58 in planar abutting relationship with the body cowl surface 22 and the ventilation screen 28. A pair of walls 60 extend perpendicularly downward from the retainer surface 58 into the body aperture 26 to hold the nut member 32 in rotatably fast relationship therewith. The walls 60 of the nut member 32 are spaced wider than the width of the body apertures 26 and have a notched section 62 along an upper portion of the outer surface 64 thereof proximate the retainer surface so that the nut member fits into the body aperture in snap-fit relationship.

In the retainer surface 58 is a pin receiving slot 66 running generally lateral to the vehicle 10 (FIG. 4A). A pin locking slot 68, narrower than the pin receiving slot 66, is formed from a pair of locking ribs 70, one on each of an inner surface 72 of each of the walls 60, so that the locking slot 68 runs generally parallel to the receiving slot 66 and generally lateral to the vehicle 10.

Still referring to FIG. 4, the push-pin 34 has an elongated, generally rectangularly shaped shank 56 with a pair of toothed edges 76 and a pair of generally flat sides 74 (only one shown). The pin is insertable through one of the mounting apertures 36 in the ventilation screen 28, through the pin receiving slot 66 in the nut member 32, and through the pin locking slot 68. The diameter of the mounting apertures 36 is generally slightly larger than the width of the shank 56 of the push-pin 34, that is, the distance from one toothed edge 76 to the other across the shank 56 of the push-pin 34. The width of the pin receiving slot 66 is preferably equal to the diameter of mounting aperture 36. The width of the pin locking slot 68 is preferably less than the width of the pin shank 56 from toothed side 76 to toothed side 76, but greater than the width of the shank 56 between flat sides 74, that is, the length of one of the teeth on toothed side 76 of the push-pin 34.

Figure 6:
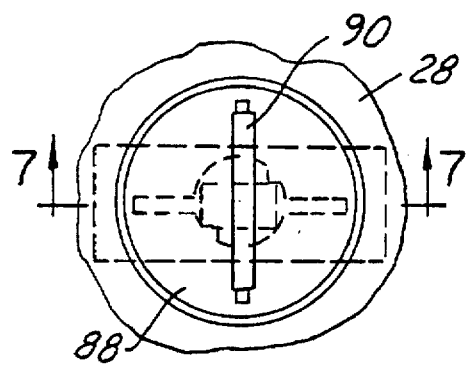
FIG. 6 is a top view of a cowl cover assembly fastener shown in the inserted, unrotated position taken along line 6—6 of FIG. 3.
Figure 9:
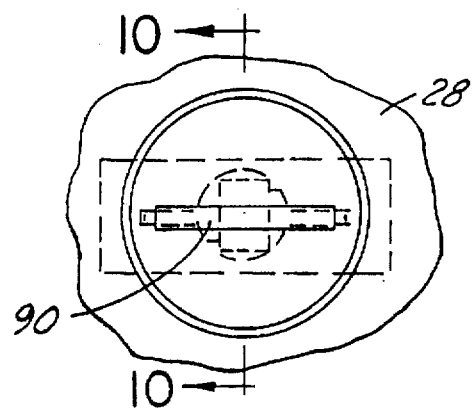
FIG. 9 is a top view of a cowl cover assembly fastener similar to FIG. 6 but shown in the inserted, rotated position seated in the pinhead seat.
Figure 7:
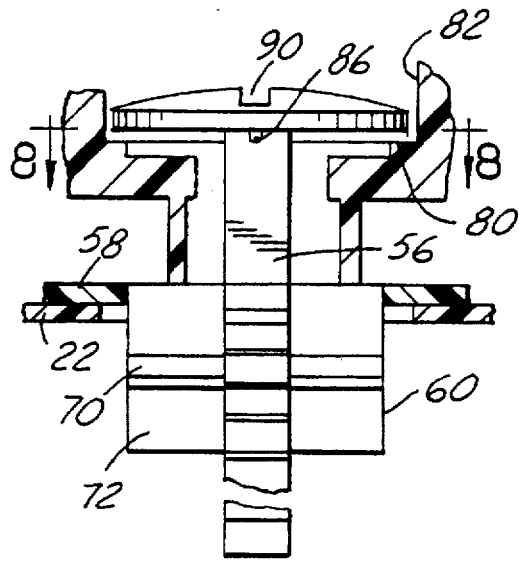
FIG. 7 is a cross-sectional view taken along line 7—7 of FIG. 6.
Figure 10:
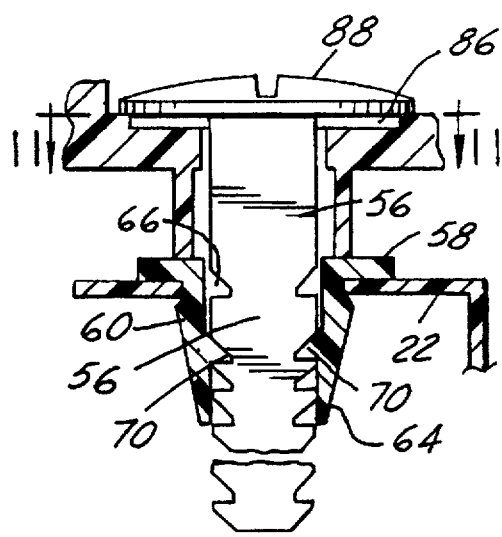
FIG. 10 is a cross-sectional view taken along line 10—10 of FIG. 9.
Figure 8:
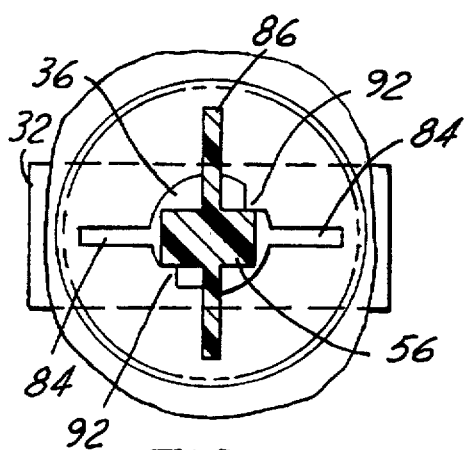
FIG. 8 is a sectional view taken along line 8—8 of FIG. 7.
Figure 11:
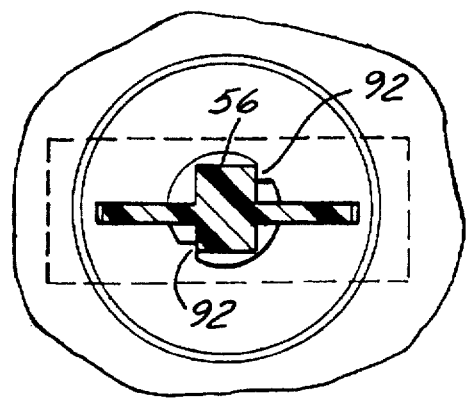
FIG. 11 is a sectional view taken along line 11—11 of FIG. 10.

A construction as described allows the push-pin 34 to be inserted through the mounting aperture 36, through the pin receiving slot 66, and through the pin locking slot 68 when the pin shank 56 is oriented with the flat sides 74 of the shank 56 parallel with the slots (FIGS. 6–8). When the push-pin 34 is rotated 90°, the toothed sides of the push-pin engage in axially locking relationship with the ribs 70 of the pin locking slot 68 to clampingly engage the ventilation screen 28 against the body cowl surface 22 (FIGS. 9–11). The push-pin 34 can thus slide laterally with respect to the nut member 32 to compensate for lateral relative movement between the ventilation screen 28 and the body cowl surface 22 when changes in temperature therearound result in unequal lateral expansion due to the differences in coefficients of thermal expansion.

The push-pins 34 have a circular shaped pin-head 78 on one end for mating with a seat 80 formed by an annular depression 82 around mounting apertures 36 in the ventilation screen 28. The seat 80 has a rotation limiting groove 84 extending diametrically there across which mates with a key 86 on the bottom surface 87 of the pin-head 78 (FIG. 5).

On the pin-heads 78 a generally semi-spherical top surface 88 have a screwdriver slot 90 extending diametrically there across to facilitate rotation of the pin-head 78 when inserted into the mounting apertures 36. The groove 84 and the key 86 of the pin-head seat 80 and pin-head 78, respectively, provide a mechanism for the installer to ascertain when the pin is appropriately oriented so that the toothed sides thereof have engaged the locking ribs 70 of the nut member 32 so as to lock the push-pin 34 in axial relationship with the nut member 32. Preferably, the screwdriver slot 90 is oriented parallel with the pin-head key 86 and aligns parallel with a leading edge of the windshield to lend a pleasing appearance thereto. As seen in FIG. 4, the mounting aperture 36 additionally has a pair of stops 92 along the periphery thereof circumferentially spaced 180° apart. The stops 92 limit the push-pins to 90° of rotation when inserted into the mounting aperture 36 and into the nut member. Rotation of the push-pin 34 90° will orient the toothed edges 76 thereof in locking engagement with the locking ribs 70 of the nut member 32 to provide an axially fast relationship therewith.

The push-pin 34 and nut member 32 are made of a plastic material, preferably of the same material as the ventilation screen 28, and can be injection molded pieces. The ventilation screen 28 can likewise be injection molded.

Although the preferred embodiment of the present invention has been disclosed, various changes and modifications may be made without departing from the scope of the invention as set forth in the appended claims.

We claim:

1. A cowl cover assembly for an automotive vehicle having a body formed of a metallic material with a first coefficient of thermal expansion defining an engine compartment and a passenger compartment, a cowl inner panel positioned rearwardly proximate of the engine compartment, a cowl outer panel with a laterally extending body cowl surface between the cowl inner panel and the passenger compartment forming an air intake opening between the cowl inner panel and the body cowl surface, the cowl cover assembly comprising:

(1) a plurality of laterally spaced, rectangularly shaped body apertures in the body cowl surface;

(2) an elongated ventilation screen covering the air intake opening with ventilation slots therein, the screen having a second coefficient of thermal expansion and a plurality of circular mounting apertures formed therethrough registerable with the plurality of body apertures, the screen attached to the cowl inner panel on a forward edge thereof proximate the engine compartment; and (3) a plurality of fasteners engageable with the ventilation screen and the body cowl surface to clampingly urge the ventilation screen thereagainst, each of the fasteners including:

(a) a rectangularly shaped nut member fitted in one of the plurality of body apertures and having:

(i) a retainer surface in planar abutting relationship between the body cowl surface and the ventilation screen;

(ii) a first slot in the retainer surface running generally lateral to the vehicle;

(iii) a pair of walls perpendicular to the retainer surface extending into the body aperture in rotatively fast relationship therewith; and (iv) a second slot narrower than the first slot running generally parallel thereto and formed from a pair of locking ribs extending inward from the pair of walls; and (b) a toothed push-pin having an elongated, generally rectangularly-shaped shank with a pair of toothed edges separated by a pair of generally flat sides insertable through one of the plurality of apertures in axially fast relationship with the nut member and clampingly engaging the ventilation screen against the body cowl surface, the push-pin laterally slidingly received in the first slot and received in axially locking relationship with the ribs of the second slot such that the push-pin slides laterally with respect to the nut member to compensate for lateral relative movement between the ventilation screen and the body cowl surface in response to changes in temperature therearound.

2. A cowl cover assembly according to claim 1 wherein each of the plurality of circular mounting apertures has a pair of stops are circumferentially spaced 180° apart such that one of the plurality of push-pins is limited to 90° of rotation when inserted in the aperture.

3. A cowl cover assembly according to claim 2 wherein the plurality of circular mounting apertures are bounded by an annular depression in the ventilation screen forming a seat for the push-pins, the seat having a rotation limiting pin head seat groove extending diametrically thereacross.

4. A cowl cover assembly according to claim 3 wherein each of the plurality of push-pins has a circular-shaped pin head on one end thereof, the pin head having:

a flat bottom surface with a key extending diametrically thereacross for mating with the pin head seat groove; and a generally semi-spherical top surface with a screw-driver slot extending diametrically thereacross.

\* \* \* \* \*